July 13, 1926.

J. BRUNA

PROCESS FOR PRESERVING VEGETABLES

Filed July 27, 1925

1,592,719

Joseph Bruna
INVENTOR

BY Victor J. Evans
ATTORNEY

WITNESS:

Patented July 13, 1926.

1,592,719

UNITED STATES PATENT OFFICE.

JOSEPH BRUNA, OF MICA, WASHINGTON, ASSIGNOR TO AMERICAN SQUASH PRODUCTS COMPANY, OF SUNNYSIDE, WASHINGTON, A CORPORATION OF WASHINGTON.

PROCESS FOR PRESERVING VEGETABLES.

Application filed July 27, 1925. Serial No. 46,480.

This invention relates to a new and useful process for preserving vegetables and has for an object the provision of means for preserving whole squash, the process acting to seal the pores of the shell so that the squash may be kept in a wholesome and edible state for a relatively long period.

Another object of the invention is the provision of a process which, in addition to preserving the squash, will increase its palatability as an edible product.

With the above and other objects in view, the invention further includes the following novel features and details of construction, to be hereinafter more fully described, illustrated in the accompanying drawings and pointed out in the appended claims.

In the drawings:—

Referring more specifically to the drawings, like characters of reference denote corresponding parts, throughout the several views.

Figure 1:
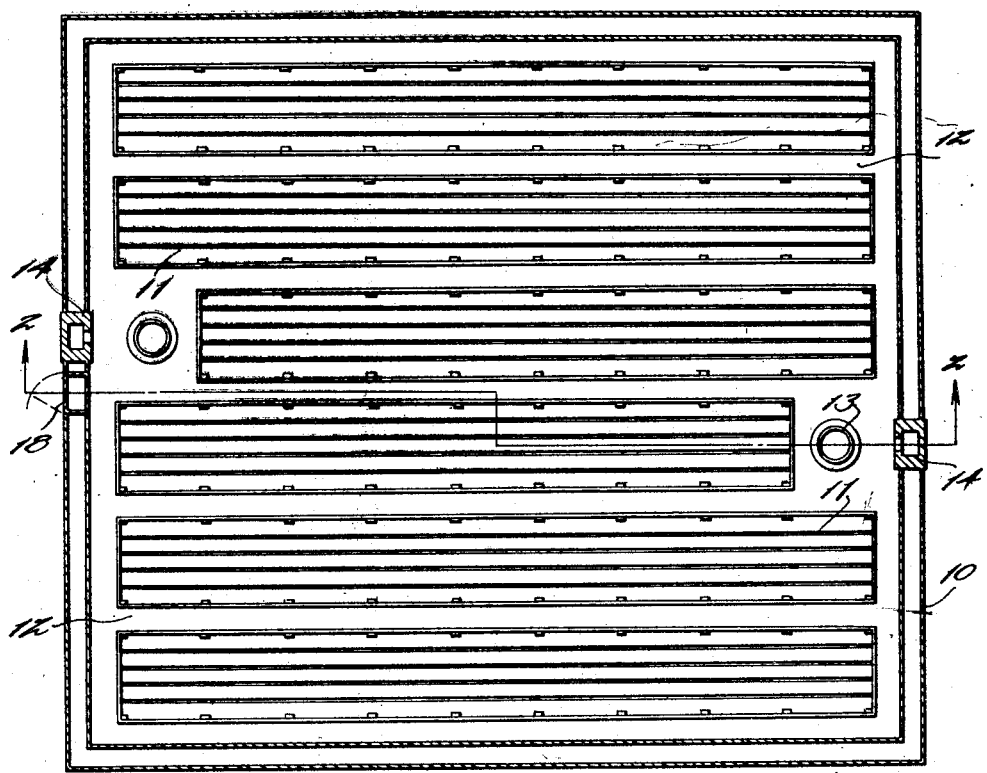
Figure 1 is a fragmentary view illustrating in plan a dehydrating or drying room in which the preserving process is carried out.
Figure 2:
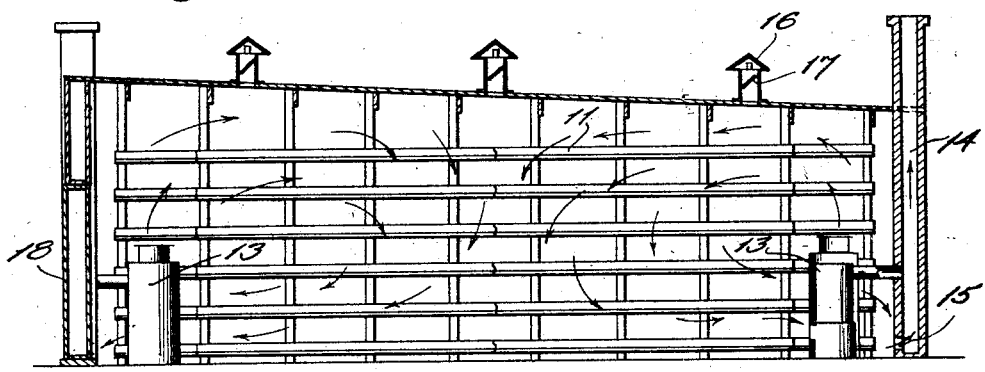
Figure 2 is a section taken substantially on the line 2—2 of Figure 1.

In carrying out the process, a dehydrating or drying room of suitable proportions is provided, the walls 10 of which are suitably insulated. Arranged within this room are vertically spaced drying racks 11 of suitable construction, the racks being suitably supported in spaced tiers so that passages 12 are provided around each tier. The drying room is equipped with heaters 13 which are in communication with flues 14 and the latter are provided at their lower ends and adjacent the floor of the room with draft openings 15. The roof of the building is equipped with ventilators 16 having adjustable dampers 17 so that ventilation within the room may be accurately controlled. The room may be sealed except for the flues 14, the ventilators 16 and a door 18.

The squash are placed in the racks not more than two deep, care being taken to provide space for the free circulation of air around each squash. The door and ventilators of the building are then closed and the temperature of the interior raised approximately 105 degrees Fahrenheit in twelve hours, by means of the heaters 13. This temperature is maintained for approximately seventy-two hours and should the temperature raise above 105 degrees Fahrenheit, the ventilators 16 are regulated so that a part of the heated air is allowed to escape. During this time, the heated air will ascend toward the roof and as a strong draft exists in the flues 14, due to the fire within the heaters and as the ventilating openings 15 are located approximately at the floor level, the heated air within the room is drawn downward to the floor and passes out through the flues. A complete circulation of heated air will thus pass backward and forward through the racks around the squash.

This circulation of heated air removes the moisture from the shell of the squash and hardens the shell and at the same time kills the fungus growth or blue mold which ordinarily causes squash to decay. The heated air also converts a portion of the acid content of the squash into sugar and thus creates a more edible product. The moisture removed from the shell of the squash is carried out through the flues with the heated air.

After seventy-two hours of this treatment, the temperature in the room is decreased to approximately eighty degrees Fahrenheit, this being effected by regulating the dampers 17, or by the admission of cool air from the outside if necessary. This lowering of of the temperature is done to avoid overheating or cooking the squash, so that the action of drying may be confined to the shell only. This reduction in temperature occupies approximately seventy-two hours, the temperature being gradually reduced from its former state of 105 degrees Fahrenheit to eighty degrees Fahrenheit.

At the expiration of the seventy-two hours mentioned, the temperature within the room is again raised to 105 degrees Fahrenheit in twelve hours, this heat being maintained for seventy-two hours. After this time, the temperature is rapidly reduced to fifty degrees Fahrenheit, this rapid reduction acting to chill the squash and permanently seal the pores of the shell. The preserving operation is then complete. The temperature may then be raised to approximately seventy degrees and maintained at this figure until the squash are removed from the racks.

The process properly carried out will preserve the squash in a manner to keep in a sweet and wholesome condition for approximately six months or more in excess of the period in which unprocessed squash would decay.

I claim:—

1. The herein described process of preserving squash consisting of subjecting the squash to sufficient heat to remove moisture from the squash shell and convert a portion of its acid content into sugar, permitting the quash to partially cool, again subjecting the squash to a higher temperature and subsequently rapidly cooling said squash to seal the pores of the shell.

2. The herein described process of preserving vegetables consisting of subjecting the vegetables to the action of dry heated air of sufficient temperature to remove the outer moisture, then sufficiently reducing the temperature to prevent cooking the vegetables, then increasing the temperature for an appreciable period and afterward subjecting the vegetables to a chilling action to seal the pores of the vegetables.

In testimony whereof I affix my signature.

JOSEPH BRUNA.